United States Patent
Kim et al.

(10) Patent No.: US 11,843,309 B2
(45) Date of Patent: Dec. 12, 2023

(54) OIL RECOVERY STRUCTURE FOR COOLING MOTOR

(71) Applicants: HYUNDAI MOTOR COMPANY, Seoul (KR); KIA CORPORATION, Seoul (KR)

(72) Inventors: Shin Jong Kim, Hwaseong-si (KR); Jong Hyun Kim, Suwon-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 329 days.

(21) Appl. No.: 17/470,103

(22) Filed: Sep. 9, 2021

(65) Prior Publication Data

US 2022/0109352 A1 Apr. 7, 2022

(30) Foreign Application Priority Data

Oct. 5, 2020 (KR) ................. 10-2020-0127861

(51) Int. Cl.
*H02K 9/00* (2006.01)
*H02K 9/193* (2006.01)
*H02K 9/26* (2006.01)
*H02K 5/20* (2006.01)

(52) U.S. Cl.
CPC .............. *H02K 9/193* (2013.01); *H02K 5/20* (2013.01); *H02K 5/203* (2021.01); *H02K 9/26* (2013.01)

(58) Field of Classification Search
CPC ............ H02K 5/20; H02K 9/19; H02K 9/193; H02K 9/26
See application file for complete search history.

(56) References Cited

U.S. PATENT DOCUMENTS

| | | | |
|---|---|---|---|
| 9,726,057 B2 * | 8/2017 | Yamauchi | H02K 7/116 |
| 10,408,115 B2 * | 9/2019 | Okada | H02K 7/1815 |
| 10,630,140 B2 * | 4/2020 | Pritchard | B60K 17/046 |
| 2013/0119793 A1 * | 5/2013 | Hofkirchner | H02K 5/203 |
| | | | 310/54 |

FOREIGN PATENT DOCUMENTS

| | | | | |
|---|---|---|---|---|
| CN | 102870318 A | * | 1/2013 | ............... B60L 1/02 |
| CN | 103109112 A | * | 5/2013 | ........... B60K 17/046 |
| CN | 103262394 A | * | 8/2013 | ............. H02K 16/00 |
| CN | 103460564 A | * | 12/2013 | ............... B60K 1/00 |
| CN | 105387191 A | * | 3/2016 | |
| CN | 109681620 A | * | 4/2019 | ............. F16D 65/78 |
| CN | 109756056 A | * | 5/2019 | |
| CN | 110365138 A | * | 10/2019 | ............... B60K 1/00 |
| CN | 111379845 A | * | 7/2020 | |
| WO | WO-2019091351 A1 | * | 5/2019 | |

* cited by examiner

*Primary Examiner* — Ramon M Barrera
(74) *Attorney, Agent, or Firm* — McDonnell Boehnen Hulbert & Berghoff LLP

(57) ABSTRACT

An oil recovery structure for cooling a motor includes a rotor connected to a rotary shaft, a stator disposed on the rotor, a housing surrounding the rotor and the stator, and an oil housing disposed on the housing, in which the oil housing includes a first inlet through which the oil is introduced from a space defined on one side of the rotor, a second inlet through which the oil is introduced from a reducer connected to the rotary shaft, and a discharging port discharging the oil inside the oil housing to an oil filter.

15 Claims, 5 Drawing Sheets

OIL RECOVERY STRUCTURE FOR COOLING MOTOR

CROSS REFERENCE TO RELATED APPLICATIONS

This application claims under 35 U.S.C. § 119(a) the benefit of priority to Korean Patent Application No. 10-2020-0127861 filed on Oct. 5, 2020, the entire contents of which are incorporated herein by reference.

BACKGROUND

(a) Technical Field

The present disclosure relates to an oil recovery structure for cooling a motor having an oil housing for recovering the oil cooling the inside of the motor.

(b) Background Art

An eco-friendly vehicle is provided with a motor configured to drive a vehicle with a power source of a high-voltage battery. The motor is composed of main components for generating an output such as a permanent magnet, a core, and a coil, and heat occurs in the motor by electric resistance and magnetic resistance occurring in the main components when a current or a magnetic force flows. Therefore, in a high-temperature condition having a predetermined temperature or more, a phenomenon in which the component performance irreversibly deteriorates may occur, and the deterioration may damage the component and lower the motor performance. Therefore, to maintain the motor performance, the cooling should be provided to maintain the motor temperature at a predetermined level.

Conventionally, to cool the motor, a method for installing a cooling pipe in a motor housing, and injecting the oil delivered through the cooling pipe to a stator is adopted. The oil cooling the components of the motor are cooled again using a separate heat exchanger. However, there are problems with increasing the weight of the cooling structure and the cost for implementing the cooling structure due to the configuration such as the cooling pipe and an injection nozzle for injecting the oil. As the cooling structure essentially including the cooling pipe and the injection nozzle is applied to the motor, the total length of the entire motor is increased, and the entire volume of the structure essentially required by the heat exchanger to cool the motor is increased. Further, as the oil is injected only outside the stator, there is a problem in that the core of the stator is not cooled.

The above information disclosed in this Background section is only for enhancement of understanding of the background of the disclosure and accordingly it may include information that does not form the prior art that is already known in this country to a person of ordinary skill in the art.

SUMMARY

An object of the present disclosure is to provide an oil recovery structure for cooling a motor for recovering the oil cooling components of the motor.

Another object of the present disclosure is to provide an oil recovery structure for cooling a motor capable of removing a cooling pipe for cooling components of the motor.

An oil recovery structure for cooling a motor according to an exemplary embodiment of the present disclosure is provided. The oil recovery structure for cooling the motor includes a rotor connected to a rotary shaft, a stator disposed on the rotor, a housing surrounding the rotor and the stator, and an oil housing disposed on the housing, in which the oil housing includes a first inlet through which the oil is introduced from a space defined on one side of the rotor, a second inlet through which the oil is introduced from a reducer connected to the rotary shaft, and a discharging port discharging the oil inside the oil housing to an oil filter.

According to an example, the housing further includes an oil inlet through which the oil passing through the oil filter and with impurities removed is introduced.

According to the example, a channel cover contacting the housing is disposed within the oil housing, and the channel cover includes pins extending in the direction from the rotary shaft toward the stator.

According to an example, the oil housing is disposed to overlap the stator from the rotary shaft toward the stator, and a coolant channel through which coolant flows is defined in a space between the housing and the channel cover.

According to an example, the pins guide the oil introduced from the first inlet and the second inlet in the direction toward the discharging port.

According to an example, the space within the oil housing is divided into a first path through which the oil introduced through the first inlet flows to the second inlet, a second path meaning the inside of a space defined by the pins, and a third path guiding the oil from the second path to the discharging port, and the first path and the third path are paths defined outside the space defined by the pins.

According to an example, a motor cover sealing the housing is disposed, and the oil introduced from a space defined on one side of the rotor flows to the first inlet through an oil recovery line defined within the motor cover.

According to an example, the oil recovery line is defined outside the stator in the direction in which the rotary shaft extends.

According to an example, the oil recovery structure for cooling the motor further includes a cover dividing the space between the stator and the housing into a plurality of chambers, in which the motor cover is in contact with the cover such that the oil within the chambers is not introduced into the oil recovery line.

According to an example, the cover is disposed to surround the side surface of a coil which is one configuration of the stator, and the cover is in contact with the housing and the housing is sealed such that the oil introduced into the stator is not introduced into the rotor.

According to an example, the oil recovery structure for cooling the motor further includes an inner flow path connecting the oil recovery line to the first inlet, in which the inner flow path is defined on one side of the housing on which the oil housing is disposed, and the inner flow path is defined at the location overlapping with the cover from the rotary shaft toward the stator.

According to an example, a coolant channel through which coolant flows is defined between the housing and the oil housing, and the inner flow path is defined outside the coolant channel with respect to the direction in which the rotary shaft extends.

According to an example, the first inlet is disposed on the rear side of the motor, the second inlet is disposed on a reducer side of the motor, and the first inlet and the second inlet are disposed in the directions opposite to each other in the oil housing.

According to an example, the oil housing has a rectangular shape in a plane, and the second inlet and the discharging port are provided on one side of the oil housing together.

According to an example, the oil housing is disposed on the lower end of the housing with respect to the placement direction of the motor and the oil introduced from the space defined on one side of the rotor flows to the oil housing.

The exemplary embodiment of the present disclosure may introduce the oil cooling the bearing and the rotor connected to the rotary shaft, and the oil cooling the rotor shaft and the reducer into the oil housing to exchange heat with the coolant flowing through the coolant channel.

The exemplary embodiment of the present disclosure may remove the cooling pipe used to cool the components of the motor through the oil injection method by cooling the components of the motor through the flow paths defined within the housing. The entire of the motor may be reduced by removing the cooling pipe.

The exemplary embodiment of the present disclosure may increase the surface area of the channel cover through the pins of the channel cover, thereby improving the performance cooling the oil within the oil housing. Therefore, the heat exchanger separately provided to cool the oil may be removed.

It is understood that the term "automotive" or "vehicular" or other similar term as used herein is inclusive of motor automotives in general such as passenger automobiles including sports utility automotives (operation SUV), buses, trucks, various commercial automotives, watercraft including a variety of boats and ships, aircraft, and the like, and includes hybrid automotives, electric automotives, plug-in hybrid electric automotives, hydrogen-powered automotives and other alternative fuel automotives (e.g., fuels derived from resources other than petroleum). As referred to herein, a hybrid automotive is an automotive that has two or more sources of power, for example both gasoline-powered and electric-powered automotives.

BRIEF DESCRIPTION OF THE FIGURES

The above and other features of the present disclosure will now be described in detail with reference to certain exemplary examples thereof illustrated in the accompanying drawings which are given herein below by way of illustration only, and thus are not limitative of the present disclosure, and wherein.

Figure 1:
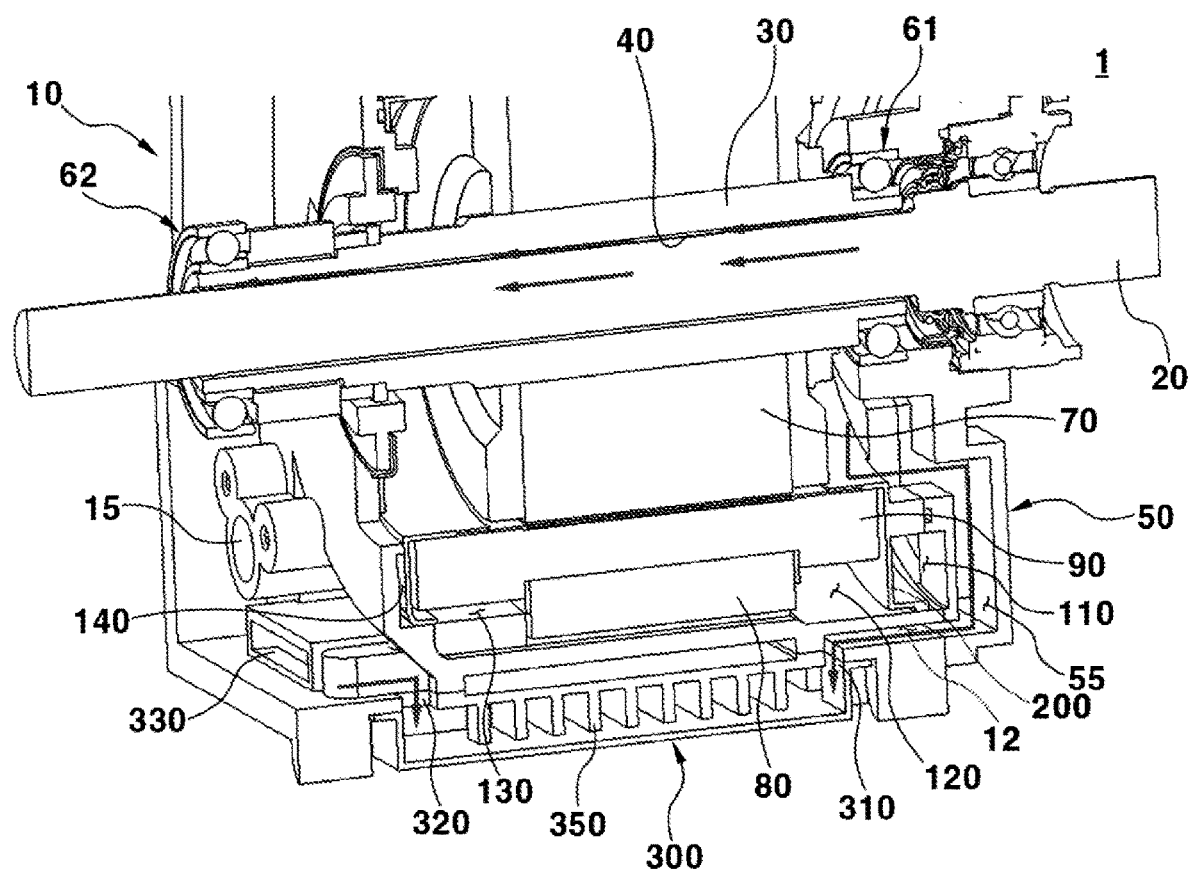
FIG. 1 is a diagram for explaining an oil recovery structure for cooling a motor according to an exemplary embodiment of the present disclosure.

It should be understood that the appended drawings are not necessarily to scale, presenting a somewhat simplified representation of various preferred features illustrative of the basic principles of the disclosure. The specific design features of the present disclosure as disclosed herein, including, for example, specific dimensions, orientations, locations, and shapes will be determined in section by the particular intended application and use environment.

In the figures, reference numbers refer to the same or equivalent sections of the present disclosure throughout the several figures of the drawing.

DETAILED DESCRIPTION

The advantages and features of the present disclosure, and the method for achieving them may be clarified with reference to the exemplary embodiment to be described later together with the accompanying drawings. However, the present disclosure is not limited to the exemplary embodiment disclosed below but may be implemented in various different forms, and the present exemplary embodiment is merely provided to complete the disclosure of the present disclosure, and to fully notify those skilled in the art to which the present disclosure pertains of the scope of the disclosure, and the present disclosure is defined by only the scope of the claims. Throughout the specification, the same reference numerals indicate the same components.

Further, in the present specification, distinguishing the names of the components into a first, a second, and the like is to distinguish them because the names of the components are the same, and the names are not limited to the order thereof in the following description.

The detailed description merely exemplifies the present disclosure. Further, the aforementioned contents illustrate and describe the preferred exemplary embodiment of the present disclosure, and the present disclosure may be used in various combinations, changes, and environments. That is, the present disclosure may be changed or modified within the range of the concept of the disclosure disclosed in the present specification, the range equivalent to the disclosed contents, and/or the range of the technology or knowledge in the art. The described exemplary embodiment describes the best mode for implementing the technical spirit of the present disclosure, and various changes required in the specific applications and uses of the present disclosure are also possible. Therefore, the detailed description of the disclosure is not intended to limit the present disclosure to the disclosed exemplary embodiment. Further, the appended claims should be interpreted as also including other exemplary embodiments.

FIG. 1 is a diagram for explaining an oil recovery structure for cooling a motor according to an exemplary embodiment of the present disclosure.

Referring to FIG. 1, a motor 1 may include a rotor 70 connected to rotary shafts 20, 30, stators 80, 90 disposed on the rotor 70, a housing 10 surrounding the rotor 70 and the stators 80, 90, and an oil housing 300 disposed on the housing 10. An oil recovery structure for cooling the motor 1 according to an exemplary embodiment of the present disclosure relates to a structure in which the oil cooling the rotor 70, the oil cooling a reducer (not illustrated), and the oil cooling the rotary shafts 20, 30 and bearings 61, 62 contacting the rotary shafts 20, 30 are introduced in to the oil housing 300.

A structure of cooling the motor 1 may adopt a method for cooling a stator core 80 and coils 90 through chambers 110, 120, 130, 140 filled with the oil and a channel 150 within the housing 10, rather than a cooling method for injecting the oil into the stators 80, 90. The rotary shafts 20, 30 may be composed of a rotor shaft 30 connected to the rotor 70 and an inner shaft 20 which is the center axis of the motor. The oil introduced through an oil inlet 15 positioned in the housing 10 may be introduced into the chamber 110 to cool the stator 70. Further, the oil introduced through the oil inlet 15 may flow to a shaft cooling flow path 40 defined between the inner shaft 20 and the rotor shaft 30 to cool the rotor shaft 30 and the bearings 61, 62. In the prior art, a cooling pipe is required for the oil injection method which is the conventional cooling method, but the oil recovery structure for cooling the motor according to the exemplary embodiment of the present disclosure may cool the rotor 70, the stators 80, 90, the rotor shaft 30, and the bearings 61, 62 through the flow paths defined inside the motor 1.

A cover 200 may divide a space between the stators 80, 90 and the housing 10 into a plurality of chambers 110, 120, 130, 140. The cover 200 may be disposed to surround the side surface of the coil 90 which is one configuration of the stators 80, 90. The cover 200 may be in contact with the housing 10 and the housing is sealed such that the oil introduced into the stators 80, 90 is not introduced into the rotor 70. However, the stators 80, 90 and the rotor 70 may divide the space disposed within the housing 10 through the cover 200, but the rotor 70 may be cooled by holes (not illustrated) defined in the cover 200.

The cover 200 may be disposed outside the coils 90 with respect to the stator core 80 and provided to extend along the inner circumferential surface of the coils 90. The inner circumferential surfaces of the coils 90 may mean the surfaces facing the rotary shafts 20, 30. One cover 200 may be disposed on each of both sides with respect to the stator core 80. The cover 200 may be in contact with the housing 10 to seal the space between the stators 80, 90 and the housing 10. The oil may flow between the chambers 110, 120, 130, 140 which are the sealed spaces through the holes (not illustrated) of the cover 200 disposed on both sides of the stator core 80. For example, the chambers 110, 120, 130, 140 may include a first chamber 110, a second chamber 120, a third chamber 130, and a fourth chamber 140. The oil introduced into the first chamber 110 may flow to the second chamber 120 through the holes (not illustrated) of the cover 200 disposed on one side of the stator core 80, the oil may flow from the second chamber 120 to the third chamber 130 through the channel 150, and the oil may flow from the third chamber 130 to the fourth chamber 140 through the holes (not illustrated) of the cover 200 disposed on the other side of the stator core 80. The oil may cool the stators 80, 90 while flowing within the chambers 110, 120, 130, 140.

To seal the housing 10, a motor cover 50 may be disposed on the rear side of the motor 1. The motor cover 50 may be in contact with the cover 200 to separate the chambers 110, 120, 130, 140 from the space in which the rotor 70 is disposed. An oil recovery line 55 through which the oil is introduced from the space defined on one side of the rotor 70 may be positioned on the motor cover 50. The oil recovery line 55 may be defined outside the stators 80, 90 in the direction in which the rotary shafts 20, 30 extend. The motor cover 50 may be in contact with the cover 200 to block the oil within the chambers 110, 120, 130, 140 not to be introduced into the oil recovery line 55. For example, as the motor cover 50 is in contact with the cover 200 disposed on one sides of the stators 80, 90, the space between the motor cover 50 and the cover 200 disposed on one sides of the stators 80, 90 may be defined as the first chamber 110, and the space between the cover 200 disposed on one sides of the stators 80, 90, the stators 80, 90, and the housing 10 may be defined as the second chamber 120. For example, as the motor cover 50 is in contact with the cover 200 disposed on the other sides of the stators 80, 90, the space between the cover 200 disposed on the other sides of the stators 80, 90, the stators 80, 90, and the housing 10 may be defined as the third chamber 130, and the space between the cover 200 disposed on the other sides of the stators 80, 90 and the housing 10 may be defined as the fourth chamber 140.

The oil housing 300 may include a first inlet 310 through which the oil is introduced from the space defined on one side of the rotor 70, a second inlet 320 through which the oil is introduced from a reducer (not illustrated) connected to the rotary shafts 20, 30, and a discharging port 330 discharging the oil inside the oil housing 300 to an oil filter (not illustrated). The oil housing 300 may be disposed on the lower end of the housing 10 with respect to the placement direction of the motor 1. That is, the oil housing 300 may be disposed to overlap the direction from the rotary shafts 20, 30 toward the stators 80, 90.

The channel cover 350 contacting the housing 10 may be disposed within the oil housing 300. The space defined by the oil housing 300 and the channel cover 350 may be defined as an oil sump. That is, the oil sump may mean the space in which the oil for cooling the motor 1 is recovered. The channel cover 350 may include pins 355 extending in the direction from the rotary shafts 20, 30 toward the stators 80, 90. The space between the housing 10 and the channel cover 300 may be defined as a coolant channel 18 through which coolant flows. The coolant channel 18 may be disposed within the housing 10. The coolant channel 18 may be formed within the housing 10 in the directions in which the rotary shafts 20, 30 rotate (or the circumferential directions of the rotary shafts 20, 30). The channel cover 350 may be in surface contact with the coolant channel 18, and the oil within the oil housing 300 may be cooled by the coolant flowing within the coolant channel 18.

The oil introduced from the space defined on one side of the rotor 70 may be introduced into the oil recovery line 55, and the oil passing through the oil recovery line 55 may be introduced into an inner flow path 12 defined on the lower end of the housing 10. The inner flow path 12 is connected to the first inlet 310, such that the oil may flow to the oil housing 300. That is, the inner flow path 12 may connect the oil recovery line 55 to the first inlet 310. The inner flow path 12 may be defined on one side (i.e., lower end) of the housing 10 in which the oil housing 300 is disposed, and the inner flow path 12 may be defined at the location at which the cover 200 is overlapped in the directions from the rotary shafts 20, 30 toward the stators 80, 90. The inner flow path 12 may be defined outside the coolant channel 18 with respect to the directions in which the rotary shafts 20, 30 extend. The oil introduced from the space defined on one side of the rotor 70 may be the oil cooling a first bearing 61 and the rotor 70. The oil introduced through the inlet 15 may flow toward the first bearing 61 and the shaft cooling flow path 40, and the oil passing through the shaft cooling flow path 40 may be introduced into the second inlet 320 after passing through a reducer (not illustrated).

According to the exemplary embodiment of the present disclosure, the oil cooling the first bearing 61 and the rotor 70, and the oil cooling the rotor shaft 30 and the reducer (not illustrated) may be introduced to the oil housing 300 to exchange heat with the coolant flowing through the coolant channel 18. The coolant may flow on the top with respect to the channel cover 350, and the oil may flow on the bottom with respect to the channel cover 350. Therefore, the heat exchanging between the coolant and the oil may be performed by the channel cover 350.

According to the exemplary embodiment of the present disclosure, as the components of the motor 1 are cooled by the flow paths defined within the housing 10, the cooling pipe used to cool the components of the motor 1 through the oil injection method may be removed. The entire length of the motor 10 may be reduced by removing the cooling pipe.

Figure 2:
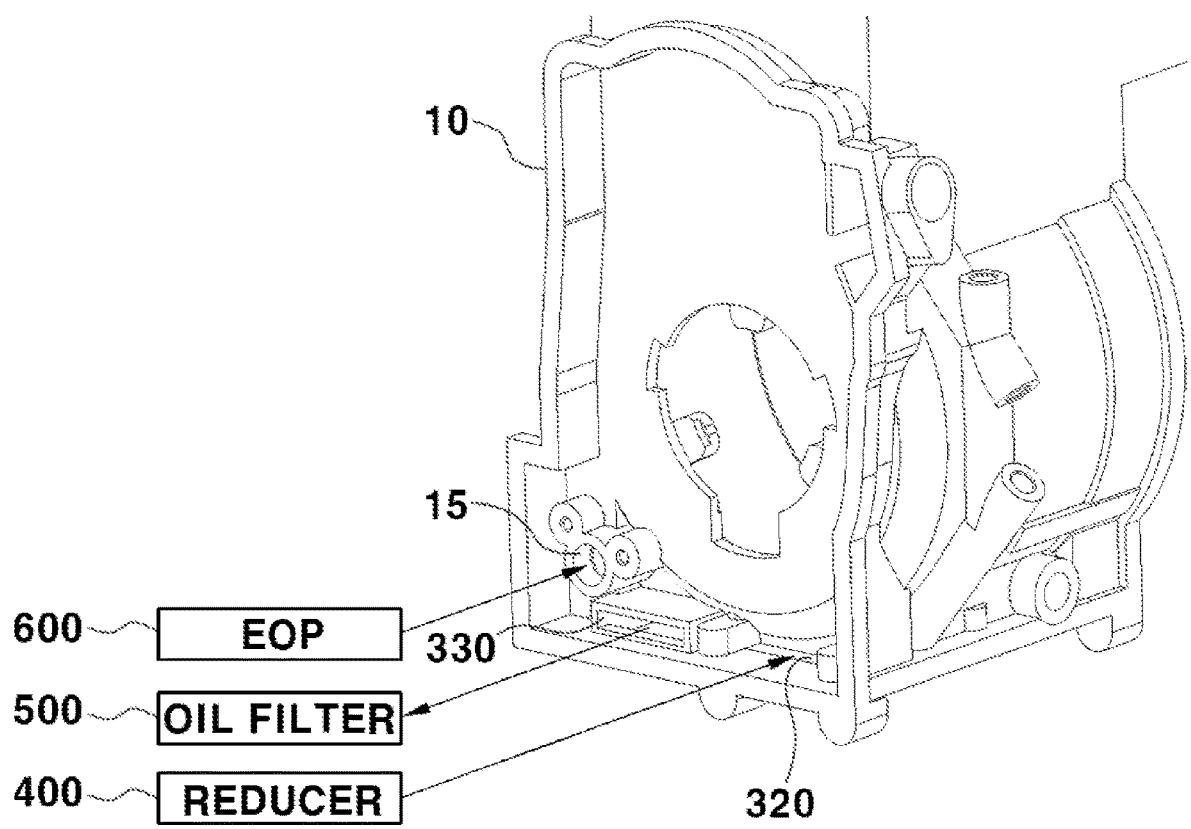
FIG. 2 is a diagram for explaining the introduction of the oil into the motor and the discharging of the oil from the motor according to the exemplary embodiment of the present disclosure.
Figure 3:
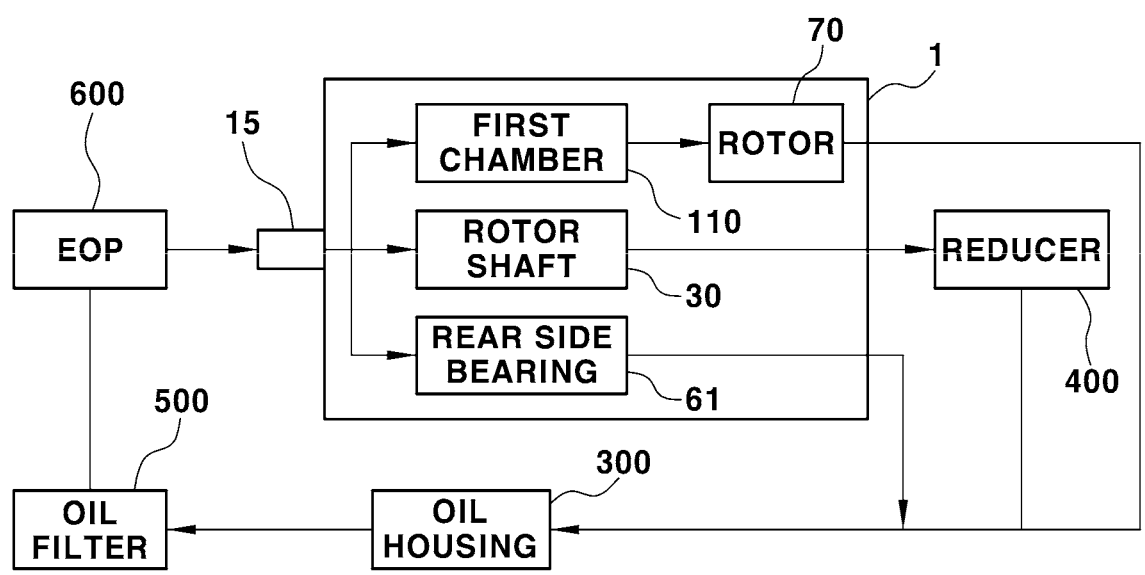
FIG. 3 is a diagram for explaining the flow of the oil cooling the motor according to the exemplary embodiment of the present disclosure.

FIG. 2 is a diagram for explaining the introduction of the oil into the motor and the discharging of the oil from the motor according to the exemplary embodiment of the present disclosure, and FIG. 3 is a diagram for explaining the flow of the oil cooling the motor according to the exemplary embodiment of the present disclosure.

Referring to FIGS. 1 to 3, the oil may be introduced through the oil inlet 15 disposed in the housing 10. The introduced oil may flow to a reducer 400 through the shaft cooling flow path 40 between the inner shaft 20 and the rotor shaft 30. The oil may cool the reducer 400 by gear churning. The oil may flow to the second inlet 320 from the reducer 400 and be introduced into the oil housing 300.

Further, the introduced oil may be introduced into the first chamber 110 to cool the stators 80, 90. The oil may be injected to the rotor 70 through the holes (not illustrated) defined in the cover 200. The oil cooling the rotor 70 may be introduced into the oil housing 300 through the space of one side of the rotor 70. One side of the rotor 70 may mean the location adjacent to the motor cover 50, and the oil may be introduced into the oil recovery line 55 through the space between the rotor 70 and the motor cover 50. The oil recovery line 55 may be connected to the inner flow path 12, and the inner flow path 12 may be connected to the first inlet 310. That is, the oil may be introduced into the first inlet 310 through the oil recovery line 55 and the inner flow path 12.

The oil introduced through the oil inlet 15 may cool the rear side bearing (the first bearing 61) of the motor 1, and the oil cooling the rear side bearing (the first bearing 61) may be introduced into the first inlet 310 through the oil recovery line 55 and the inner flow path 12.

The oil introduced into the oil housing 300 may be cooled by exchanging heat with the coolant channel 18. The cooled oil may be discharged to an oil filter 500 through the discharging port 330. The oil filter 500 may remove impurities included in the oil introduced from the oil housing 300. The oil with impurities removed may be introduced into an electric oil pump (EOP) 600, and the oil may be introduced into the oil inlet 15 through the suction and extrusion by the electric oil pump (EOP) 600.

According to the exemplary embodiment of the present disclosure, the oil housing 300 may perform the heat exchanging of the oil cooling the motor 1 and the reducer 400, and simplify the recirculation of the cooled oil. That is, the motor 1 and the reducer 400 may be collected in the oil housing 300, and the oil may be cooled by the oil housing 300 and discharged to the oil filter 500 to remove the impurities.

Figure 4:
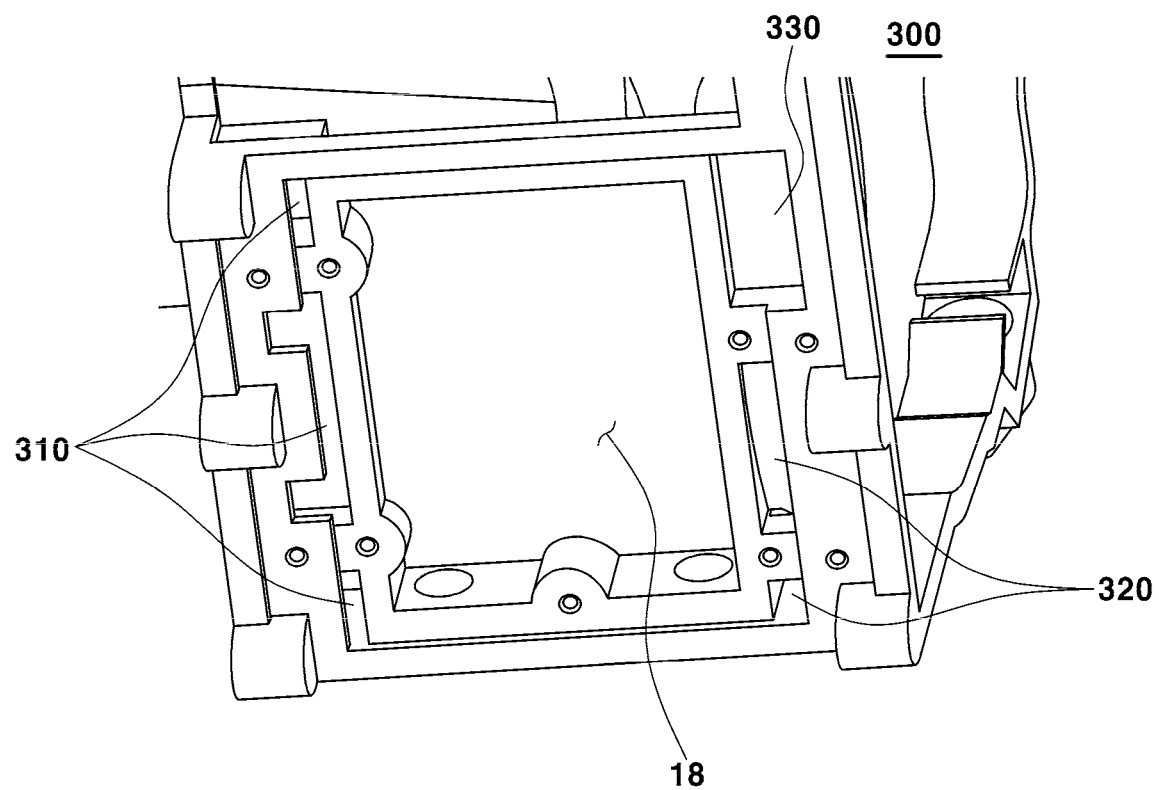
FIG. 4 is a diagram illustrating an oil housing according to the exemplary embodiment of the present disclosure.

FIG. 4 is a diagram illustrating the oil housing according to the exemplary embodiment of the present disclosure.

Referring to FIGS. 1 and 4, the oil housing 300 defined on the lower end of the housing 10 may include the first inlet 310, the second inlet 320, and the discharging port 330. Since FIG. 4 is a diagram illustrating the inside of the oil housing 300 in which the channel cover 350 illustrated in FIG. 1 is removed, the coolant channel 18, which is in surface contact with the channel cover 350 illustrated in FIG. 1, may be exposed.

The oil housing 300 may have a rectangular shape in a plane. The second inlet 320 and the discharging port 330 may be provided on one side of the oil housing 300 together. For example, the first inlet 310 may be disposed on the rear side of the motor 1, and the second inlet 320 may be disposed on the reducer side of the motor 1. The rear side may mean the location adjacent to the motor cover 50, and the reducer side may mean the location adjacent to the reducer 400 disposed adjacent to the motor 1. Therefore, the first inlet 310 and the second inlet 320 may be disposed in the directions opposite to each other in the oil housing 300.

Figure 5:
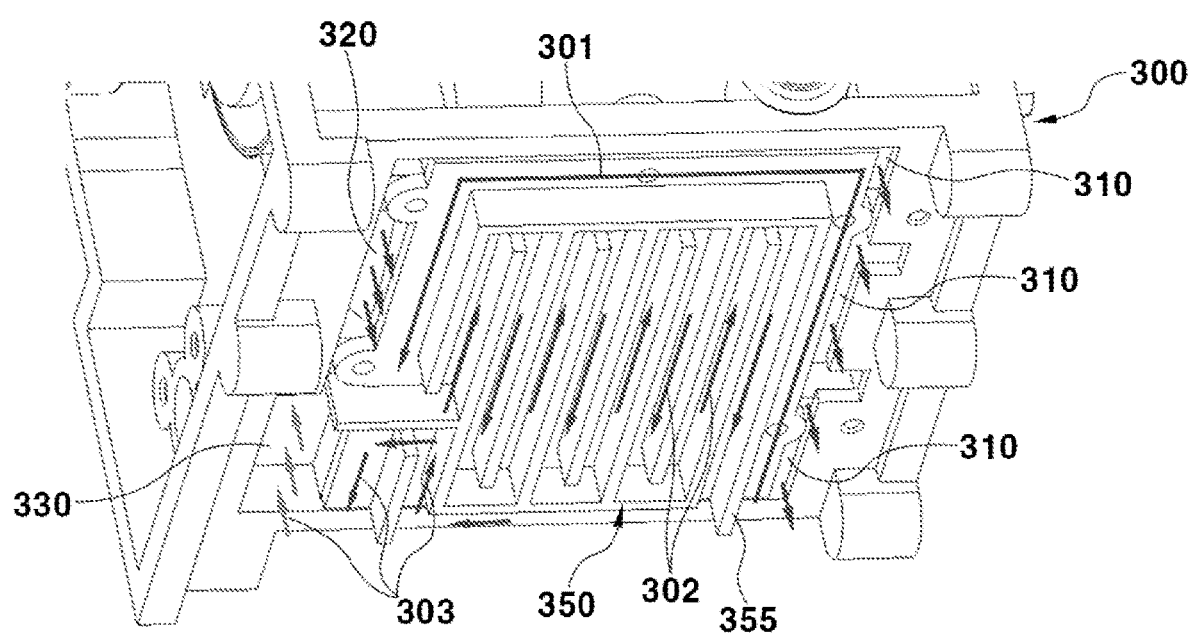
FIG. 5 is a diagram illustrating a channel cover according to the exemplary embodiment of the present disclosure.

FIG. 5 is a diagram illustrating the channel cover according to the exemplary embodiment of the present disclosure.

Referring to FIGS. 1 and 5, the channel cover 350 may include the pins 355 extending toward the lower end of the oil housing 300. The pins 355 may serve to guide the heat exchanging of the oil and the flowing path of the oil. Specifically, the pins 355 may guide the oil introduced from the first inlet 310 and the second inlet 320 in the direction toward the discharging port 330.

The space within the oil housing 300 may be divided into a first path 301 through which the oil introduced through the first inlet 310 flows to the second inlet 320, a second path 302 meaning the inside of the space defined by the pins 355 in the second inlet 320, and a third path 303 guiding the oil from the second path 302 to the discharging port 330. The first path 301, the second path 302, and the third path 303 may be connected to each other. The first path 301 and the third path 303 may mean the paths defined outside the space defined by the pins 355. That is, the first path 301 and the third path 303 may mean the space between the pins 355 and the inner wall of the oil housing 300, and the second path 302 may mean the space defined by the pins 355.

The exemplary embodiment of the present disclosure may improve the performance cooling the oil through the pins 355 of the channel cover 350. The channel cover 350 may be in surface contact with the coolant channel 18, the pins 355 may serve to increase the surface area of the channel cover 350, and the channel cover 350 having increased surface area may improve the performance cooling the oil.

While the exemplary embodiments of the present disclosure have been described with reference to the accompanying drawings, those skilled in the art to which the present disclosure pertains will understand that the present disclosure may be implemented in various specific forms without changing the technical spirit or the essential feature. Therefore, it should be understood that the aforementioned exemplary embodiments are illustrative and not limitative in all respects.

The invention claimed is:

1. An oil recovery structure for cooling a motor comprising a rotor connected to a rotary shaft, a stator disposed on the rotor, a housing surrounding the rotor and the stator, and an oil housing disposed on the housing, wherein the oil housing comprises:
   a first inlet through which oil is introduced from a space defined on one side of the rotor;
   a second inlet through which the oil is introduced from a reducer connected to the rotary shaft; and
   a discharging port discharging the oil inside the oil housing to an oil filter.

2. The oil recovery structure for cooling the motor of claim 1, wherein the housing further comprises an oil inlet through which the oil passing through the oil filter with impurities removed is introduced.

3. The oil recovery structure for cooling the motor of claim 1, wherein a channel cover contacting the housing is disposed within the oil housing, and wherein the channel cover comprises pins extending in the direction from the rotary shaft toward the stator.

4. The oil recovery structure for cooling the motor of claim 3, wherein the oil housing overlaps the stator in the direction from the rotary shaft toward the stator, and wherein a coolant channel through which coolant flows is defined in a space between the housing and the channel cover.

5. The oil recovery structure for cooling the motor of claim 3, wherein the pins guide the oil introduced from the first inlet and the second inlet in a direction toward the discharging port.

6. The oil recovery structure for cooling the motor of claim 5, wherein a space within the oil housing is divided into a first path through which the oil introduced through the first inlet flows to the second inlet, a second path comprising an inside of a space defined by the pins, and a third path guiding the oil from the second path to the discharging port, and wherein the first path and the third path are paths defined outside the space defined by the pins.

7. The oil recovery structure for cooling the motor of claim 1, further comprising a motor cover sealing the housing, and wherein the oil introduced from a space defined on one side of the rotor flows to the first inlet through an oil recovery line defined within the motor cover.

8. The oil recovery structure for cooling the motor of claim 7, wherein the oil recovery line is defined outside the stator in the direction in which the rotary shaft extends.

9. The oil recovery structure for cooling the motor of claim 7, further comprising a cover dividing a space between the stator and the housing into a plurality of chambers, and wherein the motor cover is in contact with the cover such that the oil within the chambers is not introduced into the oil recovery line.

10. The oil recovery structure for cooling the motor of claim 9, wherein the cover surrounds the side surface of a coil which is one configuration of the stator, and the cover is in contact with the housing and the housing is sealed such that the oil introduced into the stator is not introduced into the rotor.

11. The oil recovery structure for cooling the motor of claim 9, further comprising an inner flow path connecting the oil recovery line to the first inlet, wherein the inner flow path is defined on one side of the housing on which the oil housing is disposed, and the inner flow path is defined at the location overlapping with the cover in the direction from the rotary shaft toward the stator.

12. The oil recovery structure for cooling the motor of claim 11, wherein a coolant channel through which coolant flows is defined between the housing and the oil housing, and wherein the inner flow path is defined outside the coolant channel with respect to the direction in which the rotary shaft extends.

13. The oil recovery structure for cooling the motor of claim 1, wherein the first inlet is disposed on a rear side of the motor, wherein the second inlet is disposed on a reducer side of the motor, and wherein the first inlet and the second inlet are disposed in directions opposite to each other in the oil housing.

14. The oil recovery structure for cooling the motor of claim 13, wherein the oil housing has a rectangular shape in a plane, and wherein the second inlet and the discharging port are provided on one side of the oil housing together.

15. The oil recovery structure for cooling the motor of claim 1, wherein the oil housing is disposed on a lower end of the housing with respect to the placement direction of the motor, and the oil introduced from the space defined on one side of the rotor flows to the oil housing.

* * * * *